United States Patent [19]
Scott et al.

[11] Patent Number: 5,955,015
[45] Date of Patent: *Sep. 21, 1999

[54] TWO-STAGE PROCESS FOR MAKING FOAM MOULDINGS FROM TUBE BLANKS

[75] Inventors: Anthony J Scott; Kevin Jackson, both of Christchurch, New Zealand

[73] Assignee: Evolution Foam Moldings Limited, New Zealand

[*] Notice: This patent issued on a continued prosecution application filed under 37 CFR 1.53(d), and is subject to the twenty year patent term provisions of 35 U.S.C. 154(a)(2).

[21] Appl. No.: 08/817,915

[22] PCT Filed: Oct. 10, 1995

[86] PCT No.: PCT/NZ95/00102

§ 371 Date: Jun. 9, 1997

§ 102(e) Date: Jun. 9, 1997

[87] PCT Pub. No.: WO96/11096

PCT Pub. Date: Apr. 18, 1996

[30] Foreign Application Priority Data

Oct. 10, 1994 [NZ] New Zealand ............................ 264646

[51] Int. Cl.⁶ .................................................. B29C 44/02
[52] U.S. Cl. .............................. 264/54; 264/55; 264/146
[58] Field of Search .......................... 264/46.9, 54, 419, 264/425, 146, 55; 249/144

[56] References Cited

U.S. PATENT DOCUMENTS

| | | | |
|---|---|---|---|
| 620,286 | 2/1899 | Dodge ..................................... | 264/46.9 |
| 3,812,225 | 5/1974 | Hosoda et al. ............................ | 264/54 |
| 4,048,275 | 9/1977 | Usamoto et al. ......................... | 264/54 |
| 4,073,844 | 2/1978 | Wada et al. .............................. | 264/55 |
| 4,102,966 | 7/1978 | Duperray et al. ........................ | 264/112 |
| 4,282,277 | 8/1981 | Austen et al. ............................ | 264/323 |
| 4,367,185 | 1/1983 | Nojiri et al. ............................. | 264/419 |
| 4,435,346 | 3/1984 | Ito et al. .................................. | 264/54 |
| 4,578,231 | 3/1986 | Molteni ................................... | 264/54 |
| 4,671,910 | 6/1987 | Fuhrmann ................................ | 264/54 |
| 4,867,923 | 9/1989 | Topcik et al. ............................ | 264/54 |
| 4,882,108 | 11/1989 | Nakajima et al. ........................ | 264/54 |
| 4,900,490 | 2/1990 | Kozma ..................................... | 264/54 |
| 4,973,609 | 11/1990 | Browne .................................... | 521/81 |
| 5,043,115 | 8/1991 | Aoshima et al. ......................... | 264/54 |
| 5,071,886 | 12/1991 | Aoshima et al. ......................... | 264/54 |
| 5,242,634 | 9/1993 | Matsumoto et al. ...................... | 264/55 |
| 5,281,377 | 1/1994 | Iwano et al. ............................. | 264/55 |
| 5,700,407 | 12/1997 | Branger ................................... | 264/54 |

FOREIGN PATENT DOCUMENTS

| | | | |
|---|---|---|---|
| 0 186 110 | 7/1986 | European Pat. Off. ................. | 264/54 |
| 2217149 | 9/1974 | France .................................... | 264/46.9 |
| 48-12420 | 4/1973 | Japan ..................................... | 264/46.9 |
| 53-2904 | 2/1978 | Japan ..................................... | 264/46.9 |
| 56-28834 | 3/1981 | Japan ..................................... | 264/46.9 |
| 448486 | 6/1936 | United Kingdom ................. | 264/46.9 |

*Primary Examiner*—Allan R. Kuhns

[57] ABSTRACT

A technique of producing polyolefin foam is described. A two-stage process is described wherein the first stage involves expanding a preformed cylindrical tube comprising a polymer, blowing agent, cross-linking agent and blowing agent activator in an enclosed cylindrical mold. The cylindrical mold constrains the expansion of the foam without the need for hydraulic rams or similar mechanical means as are found in conventional platen presses. Following stage one, the cylindrical tubes of material are heated while unconstrained and expands symmetrically. The cylindrical tube of expanded foam material is then slit and may be cold pressed in order to form polyolefin foam blanks. Variations on the cylindrical tube mold shape may be used and patterns and other features may be formed on the interior of the cylindrical mold in order to produce a product containing the imprint thereof. Polyolefin foam so produced may be used in building, packaging, clothing and similar applications.

9 Claims, 6 Drawing Sheets

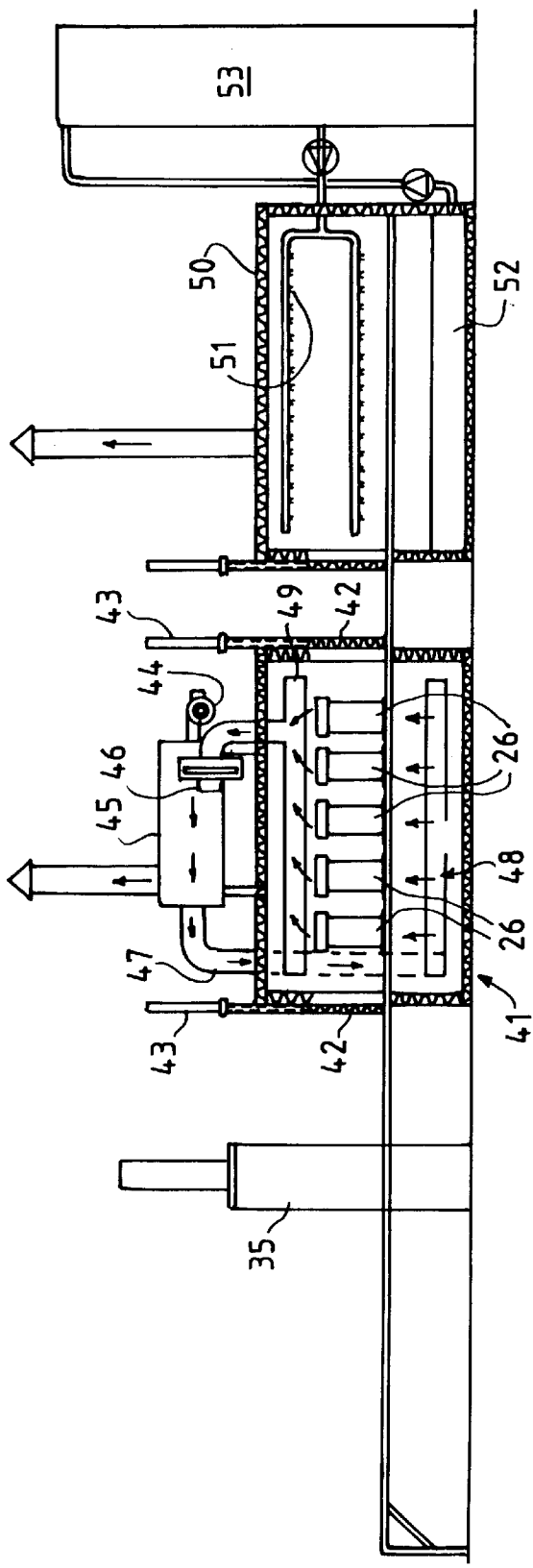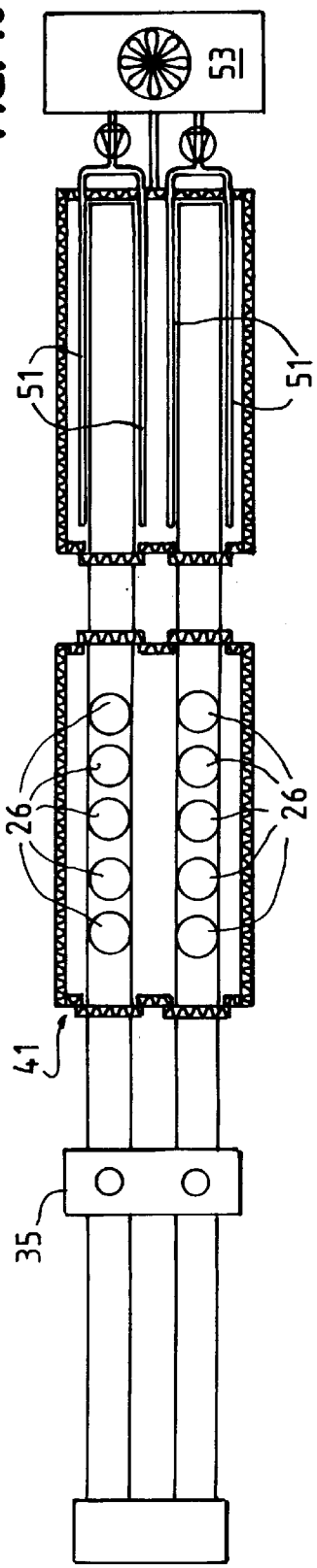

TWO-STAGE PROCESS FOR MAKING FOAM MOULDINGS FROM TUBE BLANKS

TECHNICAL FIELD

The present invention relates to the production of polyolefin foam and similar materials.

More particularly, although not exclusively, the present invention relates to processes and apparatus for the production of polyolefin foams, polyolefin foam intermediate products and moulding processes for polyolefin foam.

BACKGROUND TO THE INVENTION

Polyolefin foams are produced by modifying a raw polymer material by introducing a dispersed-gas phase into the structure of the polymer. This process is conventionally performed by dispersing a blowing agent and cross-linking agents into a polymer melt and exposing the resulting compound to an environment where the blowing agent decomposes thereby releasing the gas and expanding the polymer.

Cross linking modifies the physical characteristics of the expanded foam product, the primary characteristics being the cell size and degree of cell closure.

To the present time, methods of producing polyolefin foam include forming calendered or otherwise preformed flat sheets which are then expanded in a one or two stage process. The sheets are heated in a mould to activate a decomposable, gas-releasing blowing agent. This process will cause the calendered or otherwise formed sheets to expand to up to approximately twenty times their original volume.

The heating and subsequent blowing agent activation step may be carried out in two steps using two different sized moulds. The sheets may be blown in one mould to an intermediate size following which they are blown to their final size in a second mould. The intermediate moulding step helps limit the stresses produced in the foam during the expansion process. The sheets must be blown in restraining moulds as flat sheets distort during blowing by expanding more in the centre and along the long sides. This is due to variations in surface tension of the foam surface. Surface tension effects are less significant in these regions than at the corners.

Other techniques include single step extrusion of planks, rounds and special purpose profiles. In this process, the extrusion of the polymer-blowing agent mixture is conventional, however before the mixture is allowed to expand it is passed through, for example, an annular channel. As the mixture leaves the channel, it is expanded. The product can be expanded to useful volumes, however the extruded product incorporates integral nonexpanded skins which can reduce the overall density by about a half.

Further objects and advantages of the invention will become apparent from the following description which is given by way of example only.

The object of the present invention is to provide alternative methods and apparatus for producing moulded polyolefin foams, said methods and apparatus having reduced energy requirements compared to conventional processes and employing a simplified and compact mould construction requiring reduced clamping pressures or to at least provide the public with a useful choice.

DISCLOSURE OF THE INVENTION

According to a first aspect of the invention there is provided a process for the production of foams including:

the preparation of a preformed cylindrical tube of unexpanded material formed by either moulding or extruding a compounded material.

Preferably the unexpanded material includes a polymer, blowing agent, cross-linking agent, and blowing agent activator.

Preferably the process for the production of foams further comprises:

heating the preformed cylindrical tube of material while the preformed cylindrical tube is confined in a mould having a substantially annular cavity.

In an alternative embodiment, the blowing agent undergoes at least partial decomposition while the material is heated in the mould.

Preferably the preformed cylindrical tube of material is at least partially cross-linked while being heated in the mould.

Preferably the at least partial cross-linking can be controlled by rapid cooling of the mould.

Preferably the process for the production of foams further comprises:

expanding the material into a foam product.

Preferably the material is expanded or blown free of expansion constraints in a hot air oven or similar environment.

Preferably the preformed tubes are expanded or blown while oriented with their longitudinal axis aligned vertically while standing free in an oven.

Preferably the preformed and/or cross-linked tubes are heated while hanging on a substantially horizontal revolving mandrel or roller.

Preferably the process for the production of foams further comprises:

slitting the expanded tube parallel to its longitudinal axis and cooling it as a flat sheet.

Preferably the moulds are heated by hot air, hot oil or the like.

Preferably, the material is a compounded polyolefin foam material or similar.

The invention further provides for a mould for use in the at least partial expansion and/or cross linking of a compounded material, wherein the mould incorporates an enclosed annular cavity.

Preferably the mould comprises an interior member and an exterior member defining an annular cavity therebetween, wherein the tubular cavity is sealed at each end by closure means.

Preferably at least one of the closure means is removable.

Preferably the annular cavity may be circular, elliptical, polygonal or similar in cross sectional shape with dimensions which are either constant or varying along the length of the annular cavity.

Preferably the interior of the mould may incorporate patterns, rugosities or similar indentations thereby causing the expanded product to have a surface pattern or particular cross-sectional shape.

The present invention further provides for moulds with elliptical, annular cavities with aspect ratios between 1:3 and 3:1.

Preferably the cavity shapes may include rectangled and rounded corners with aspect ratios between 1:3 and 3:1.

The invention will now be described by way of example only and with reference to the drawings in which:

BRIEF DESCRIPTION OF THE DRAWINGS

FIG. 9 illustrates a schematic layout of a 2 step processing plant.

FIG. 10 illustrates a top view of the plant of FIG. 9.

Figure 1:
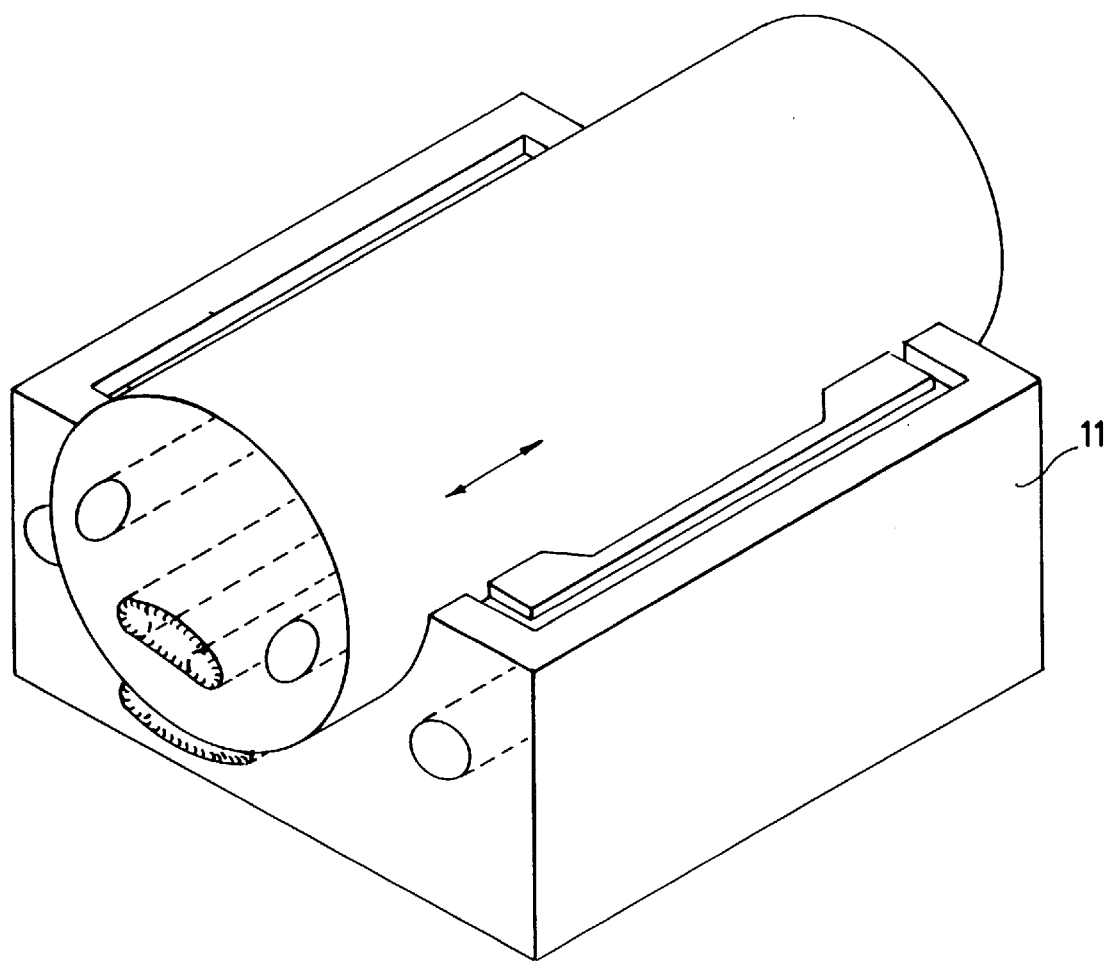
FIG. 1 illustrates a perspective view of a cylindrical mould press.
Figure 2:
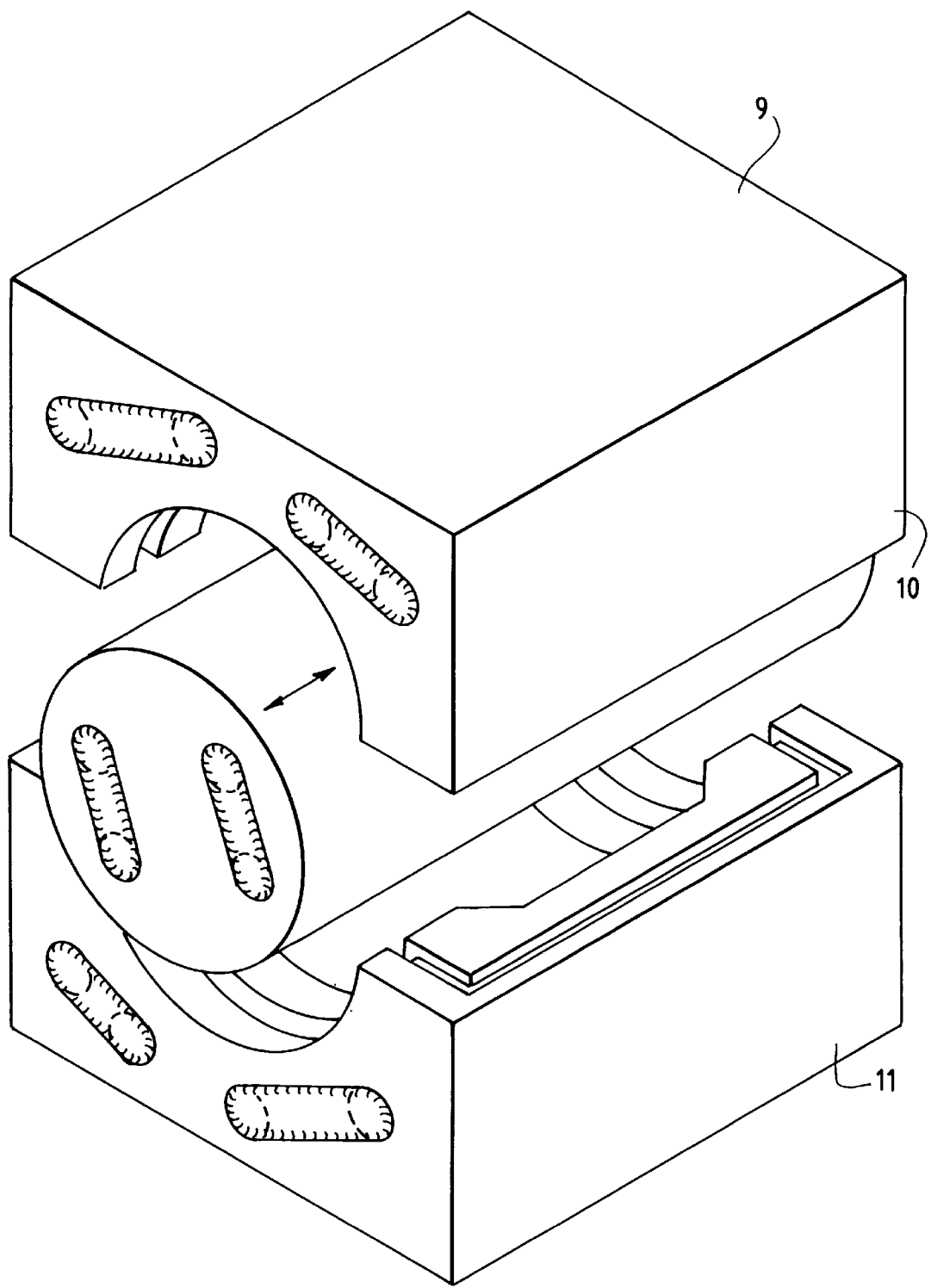
FIG. 2 illustrates a perspective view of a cylindrical mould press showing the two half shells and the central core.
Figure 3:
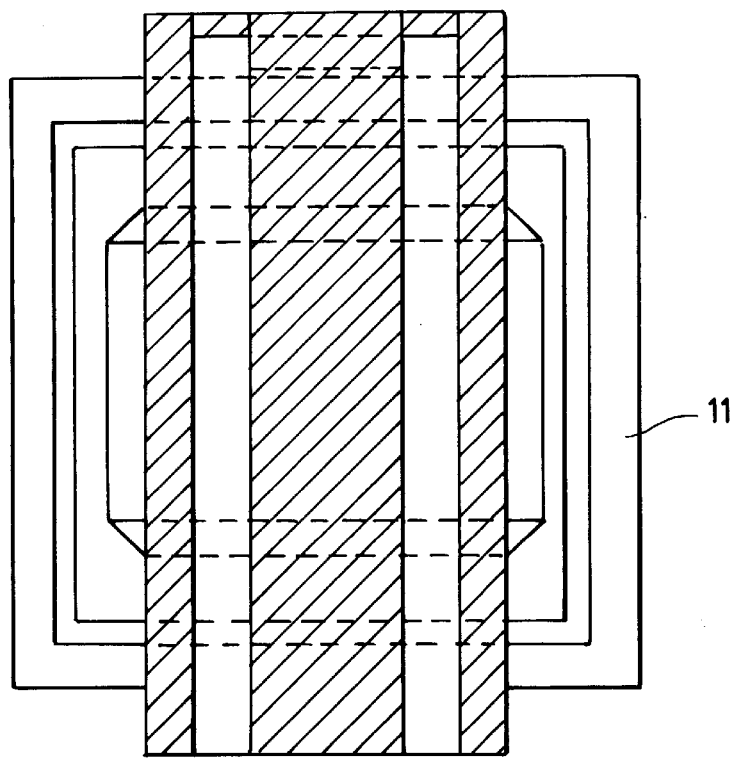
FIG. 3 illustrates a top view of a cylindrical mould press.
Figure 4:
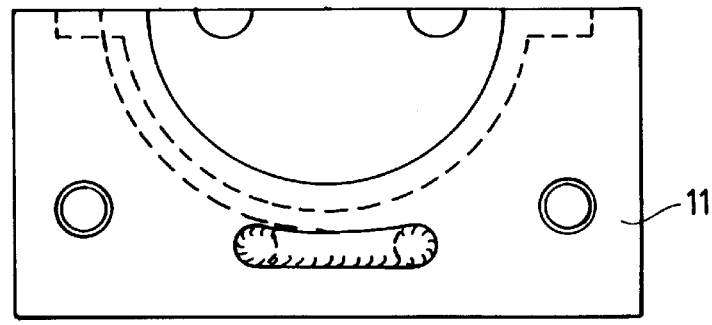
FIG. 4 illustrates an end view of a cylindrical mould press.
Figure 5:
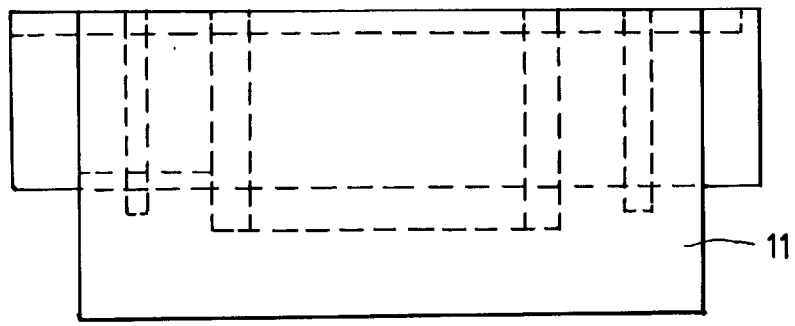
FIG. 5 illustrates a side view of a cylindrical mould press.

Prior art moulding presses for foams conventionally comprise two or more flat platens. The preformed material is introduced into the planar cavity between the platens and heat applied to effect polymer cross-linking and expansion. Such moulds require large clamping forces and, due to the geometry of the mould, heat losses can be significant thus increasing the total energy requirements of the moulding process.

Further, surface tension effects during the expansion process usually result in inhomogeneous expansion in the preformed material. This produces distortions in the foam sheets which must be cut or machined to provide a useable product. The degree of distortion may be mitigated to some extent by means of cooling.

The present invention provides for a method which mitigates some of the abovementioned disadvantages and is as follows:

(1) A tubular preform of compounded material is formed by means of an injection moulder, extruder or similar means known in the art. The compounded material generally comprises a polymer material, blowing agent, cross-linking agent and blowing agent activator. A particular advantage of this technique is that the compounded preform may be manufactured and shipped to a different location for further processing. This is desirable in situations where a foam consumer does not wish to invest in the equipment necessary for producing the raw compounded preform. To this end, a supplier can provide custom made compounded preforms in a robust and chemically stable form ready for further processing.

(2) The tubular preform is inserted into an annular mould. In the exemplary embodiment described herein, the mould shape corresponds to an annular volume and examples of such constructions are shown in FIGS. 1 to 8. While an annular mould is described herein, the essential element is that the mould forms an annular cavity. Annular is understood to include any ring-like cross-sectional geometry including circular and elliptical cross sections, rounded squares and the like.

Once the preform is inserted into the mould, the mould is heated by means appropriate to the mould design. Upon heating, the tubular preform undergoes at least partial cross-linking which results in at least partial expansion.

The preform may, under some circumstances, be heated so that the blowing agent may be partially decomposed in the present step.

The preform is constrained in the annular volume during heating and cross-linking. At this time, the internal mould pressure can be as high as approximately 3000 psi. However, in contrast to conventional methods of forming expanded foams, the large pressures may be more effectively constrained by the use of a cylindrical annular volume mould. The force vectors resulting from expansion are oriented radially outwards and inwards from and toward the central axis of the cylindrical mould respectively. In this way, the forces are distributed in a manner analogous to a spherical or cylindrical vessel containing liquid or gas under high pressure.

(3) The mould is usually cooled by means of a water spray. This allows the at least partially cross-linked preform (hereafter referred to as the cross-linked blank) to be removed from the mould with relative ease. In the case of the mould shown in FIGS. 7 and 8, this is done by removing the end closure following which the blank is drawn out. Alternatively, a hydraulic press may be used to extract the cross-linked blank as in FIG. 6.

The cross-linked blank is chemically stable and robust, and may be shipped to another site for expansion into the foam product. This is again advantageous in that a foam consumer might only wish to invest in machinery sufficient to carry out the final expansion step (step 4). In this case, cross-linked blanks can be readily shipped to a users location.

(4) The cross-linked blanks are then free expanded in an oven or similar type of heating booth at temperatures greater than or equal to that at which the blowing agent decomposes. The resulting foam product is in the form of a cylindrical foam bun.

Expansion may be effected with the blank sitting on it's end in the oven or rotating on a mandrel to enhance uniform expansion. Other variations and orientations are envisaged and are considered within the scope of the present invention.

Conventional platen presses must be constrained by means of hydraulic rams to prevent the (planar) platens from being forced apart. In contrast, the moulds of the present invention are of compact construction and require either reduced or no external restraining means to resist the expansion of the foam. The preferred mould construction described below can stand free without any hydraulic ram or press during heating (step 2 above). It does not need any jacketed form of heating or cooling as it may be physically transported through a hot air booth and cooling booth.

FIGS. 1 to 5 illustrate an example of a mould according to the present invention. The mould 9 consists of upper and lower sections 10 and 11 respectively. The sections have been machined to form therein an annular space into which the material to be moulded is placed. The centre of the mould is a core which can be withdrawn to allow access to the material space. Around the periphery of the mould parts is a sprue groove for collecting excess compound from the mould cavity.

Both the mould parts and the core have formed therein channels through which a heat transfer medium is passed. Moulding foam in a cylindrical half shell mould such as that in FIG. 1 requires clamp pressures equivalent to only ⅓ of conventional flat presses.

FIGS. 2 to 5 illustrate a commercial version using the mould shown in FIG. 1 but with enlarged dimensions of 78.5 cm circumference, 40 cm depth and 20 mm gap width.

Figure 6:
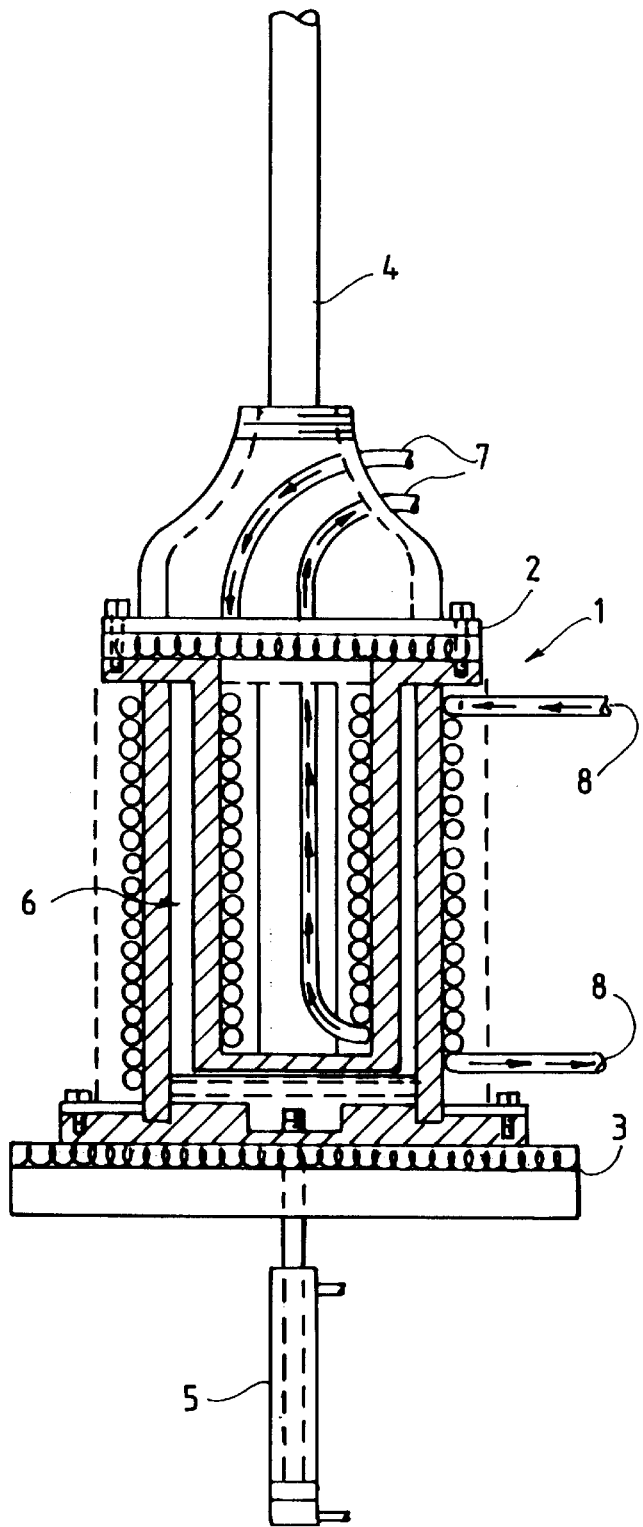
FIG. 6 illustrates a schematic view of a cylindrical mould and heating/cooling means.

FIG. 6 illustrates a further embodiment of a mould construction. The mould is constructed in two parts 2,3 each of which is supported by a hydraulic or pneumatic ram 4,5 respectively. The hydraulic rams 4,5 are adapted to draw the parts 2,3 apart and either one or both of the parts will move as required. The two parts 2,3 or the mould form between them an annular cavity 6 the length and diameter of which is selected to suit the ultimate area and thickness required.

The two parts 2,3 are independently heated via a series of pipes 7,8 respectively. The pipes are connected to a common source of heat from a hot fluid such as oil.

In this particular embodiment, the mould is heated by a circulating thermal oil. The oil can be heated by means of a heat exchanger in association with a cooling system. The cooling system is dedicated to provide rapid cooling and has the advantage of allowing for increased throughput by shortening the time before reuse of the mould.

A prototype of this embodiment was built to produce a full size foam bun of 2 m×1 m×50 mm moulded from a cylindrical preform and required a press clamp of only 30 tons. The expansion during cross-linking of the preformed cylinder requires a much smaller press area and lower clamping force than a preform of equivalent planar area.

This provides a means of manufacturing a standard 2 m×1 m sheet as yielded by a conventional flat mould, using 1/20th the clamping pressure of conventional planar presses. The invention also provides for a means of producing a larger number of sheets in larger sizes than may be produced from existing moulding presses.

The mould shown in FIG. 6 was directly heated and cooled with an oil heat transfer medium, with the cross-linked blank free expanded in a hot air chamber.

Figure 7:
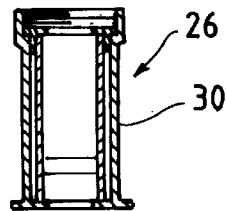
FIG. 7 illustrates a schematic view of an unclamped cylindrical mould.
Figure 8:
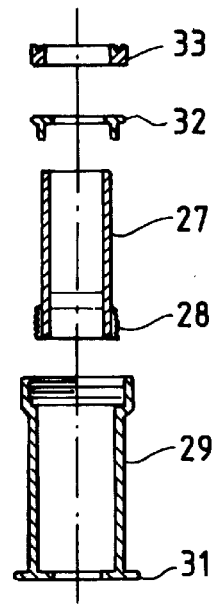
FIG. 8 illustrates an expanded view of the cylindrical mould of FIG. 7.

A preferred embodiment of a mould construction is shown as a single mould 26 in FIGS. 7 and 8. The mould 26 has a mild steel inner tubular member or sleeve 27 with a widened base circumference at 28. In the example this widened base is a brass wear ring. The sleeve 27 is fitted with an outer tube 29 to form a gap 30 of 20 mm. The tube 29 has a flange 31 at its base and an aluminium or the like pressure cap 32 which is closed, in use, by a cap screw 33.

In trials, using a smaller trial mould, a preformed polyolefin cylinder of compounded material measuring 300 mm in circumference, 8.5 cm in depth and 10 mm in thickness was inserted into the mould 26. The mould 26 was then closed with the screw cap 33 and placed inside a circulating air chamber. It was heated in a heating chamber for about 50 minutes. This period may vary depending on the foam mix.

The heated mould 26 was then removed and quickly cooled by immersion in a cold container for 5 minutes. Alternatively an evaporative water spray could be used.

On removal of the screw-in cap 33 the cross-linked blank was removed and placed unrestrained in a hot expansion chamber. After 20 minutes the blank expanded to a circumference of 85 cm×21.5 cm in depth and 24 mm in thickness. Commercial thicknesses up to 60 mm have been achieved using a larger mould.

While the present embodiment describes the treatment of a single preform and mould, it is to be understood that a number of moulds may be used in a single step. In this case, the hot air blower would be suitably sized to take a number of moulds. The heating time of the mould may be controlled by varying the preheating of the mould and preform blank. The movement of the mould(s) through the chamber may be effected by mechanical means known in the art. The mould incorporates a hollow central core which aids in uniform heating of the preform.

Figure 11:
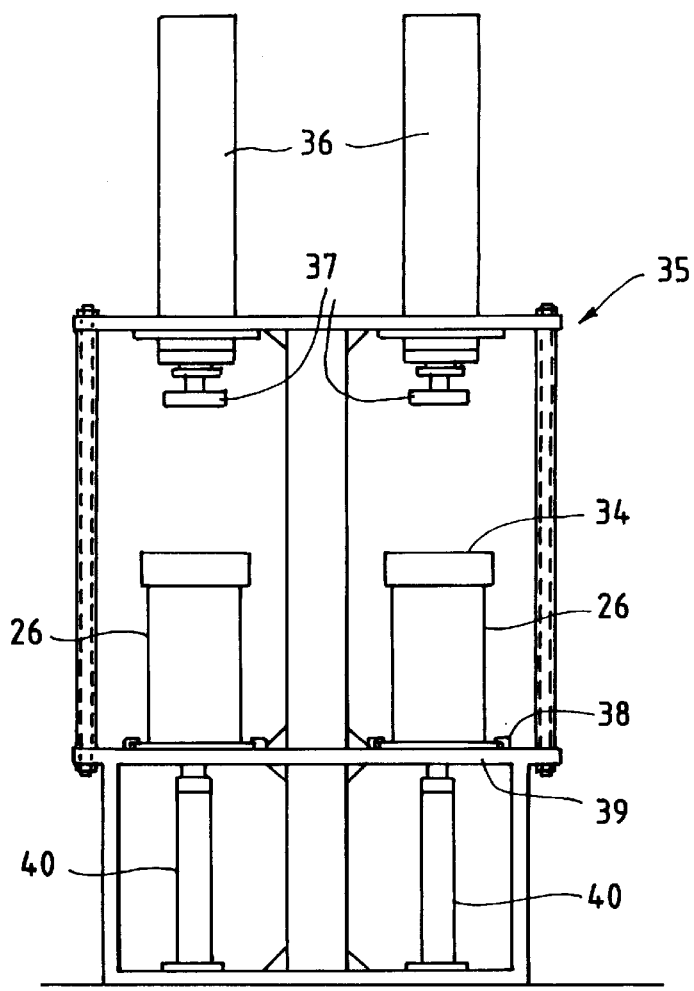
FIG. 11 illustrates a side view of a removal station.

The mould 26 is sealed with a screw-in cap 33. Due to the internal mould pressures, a small tonnage hydraulic device is used to load, close, open and unload each mould individually. This is shown in the illustration of the workstation shown in FIG. 11.

The workstation 35 is mounted with two 30 ton hydraulic rams 36 operated from each side and designed to press removable end cap 37 into the mould 26 and to allow the cap 37 to be seated and screw tightened or removed. The mould 26 is held in position by the clips 38 on the plate 39.

Hydraulic rams beneath the plate 39 can be used to remove the cross-linked preform from the mould.

The workstation 35 is positioned alongside an oven 41 shown in FIGS. 9 and 10. The oven 41 is dimensioned to have fitted therein a plurality of the moulds 26. In the example shown, ten moulds 26 are shown inserted in the oven. The oven 41 is closed by vertically sliding air operated doors 42. Control of the doors 42 can be under the operation of air rams 43 which are manually or automatically operated.

The oven 41 itself is heated by any suitable medium. The peripheral walls, roof and floor of the oven 41 are insulated.

In the present example, an LPG burner 44 is shown positioned adjacent a heat exchanger 45 from which a heat circulating fan 46 blows heated air in the direction of the arrows through the oven before it is returned via return duct 47 for re-circulation. The air flows through the hot air flow duct 48 and hot air return duct 49 past the moulds 26.

Alongside the oven 41 is a cooling spray or booth 50. The cooling booth 50 in the present example has a spray mechanism 51 for cooling the outer and inner perimeter of the moulds 26 after their removal from the oven 41. Water is recirculated from the collection bath 52 through a cooling tower 53.

Figure 12:
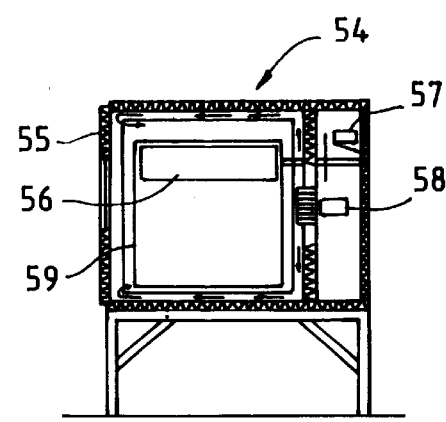
FIG. 12 illustrates a schematic view of a step 4 processing plant.

Referring to FIGS. 9, 10 and 12, the workstation 35, oven 41 and booth 50 are used in association with a free expansion oven 54. In practice the partially cross-linked forms can be exported to an alternative site for full expansion.

Figure 13:
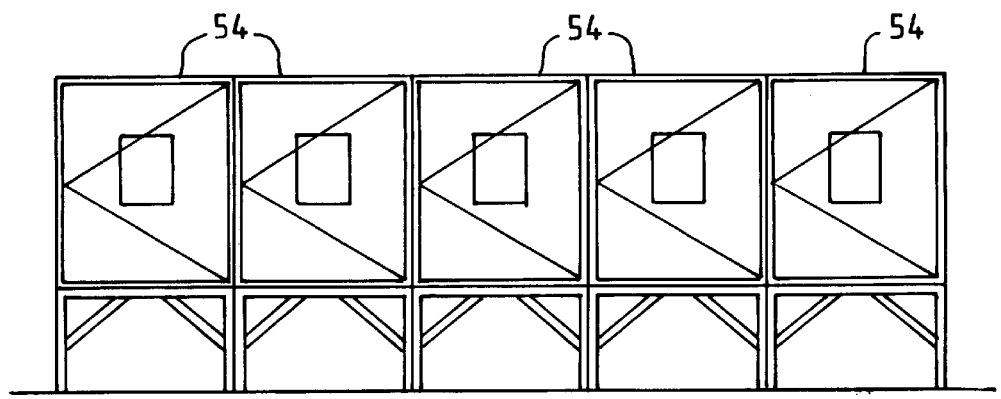
FIG. 13 illustrates a schematic of a series of step 4 processing plants.

An example of the unrestrained expansion oven 54 is shown in FIGS. 12 and 13. In this example the oven has a front opening door 55. The oven 54 has therein a mandrill or rotor 56 driven by a drive motor 57. The hot air necessary is provided by any suitable means and is circulated by the hot air circulating fan. During free expansion (step 4 above) the partially formed unit 59 is placed in the oven 54 for expansion to its full size while the rotor 56 is rotating.

The technique is particularly advantageous in that a manufacturer may choose to ship the stage one cross-linked blank in two sizes of 260 mm and 215 mm outside diameter by 400 mm length packed inside each other. Packed in this way a large volume can be packaged and transported in one unit. It has been calculated that 1852 cylinders of this type can be shipped per standard 20 ft container. The cross-linked blanks can then be expanded in a free expansion oven at the customers premises (step 4). If desired the preform cylinder blanks could be heated while hanging over a driven roller or mandrill. This will produce a large diameter tube of foam which may be used in many applications. For example, the tubular sheet may be peeled or split to yield thin foam sheeting.

Comparing the cost of shipping expanded buns at 0.16 mm$^3$ for expansion of the above, only 313 buns could be shipped per container. Using this method, freight costs could be reduced by up to two thirds.

The mould as shown in FIGS. 7 and 8 was constructed as a free-standing mould with a screw-in cap, designed to achieve the same clamping force as a hydraulic equivalent.

Heating for cross-linking (step 2 above) was achieved by circulating hot air around the mould inside an oven, and cooling by water immersion (step 3 above). A further advantage of the present invention is that, in comparison to conventional flat platen presses, the cylindrical moulds are relatively compact and may be more efficiently heated. For similar reasons, the cylindrical moulds are more easily insulated. Thus significant energy savings may be made using the apparatus and method of the present invention.

The main advantages of this mould are elimination of expensive hydraulics and a simplified mould design without a jacket for the heat transfer medium.

It is envisaged that a variety of compound formulations may be used in the present process, a number of known formulations and variations thereon being within the scope of one skilled in the relevant technical field.

Where reference has been made to elements or integers having known equivalents then such equivalents are herein incorporated as if individually set forth.

Although the present invention has been described by way of example and with reference to particular embodiments, it is to be appreciated that there are variations possible within the scope of the appended claims.

We claim:

1. A process for the production of polyolefin foam sheets including the steps of:
   (a) shaping a polymer, chemical blowing agent, cross-linking agent and blowing agent activator into a preform in the form of a cylindrical tube of unexpanded, uncross-linked material;
   (b) inserting the preform produced in step (a) into a mould, the mould having a substantially annular cavity;
   (c) heating the mould so that the preform undergoes thermal expansion, thereby pressurizing the preform, and partial cross-linking and partial decomposition of the chemical blowing agent; and
   (d) extracting a partially cross-linked, partially chemically expanded material from the annular mould.

2. A process as claimed in claim 1 wherein the partially cross-linked and partially chemically expanded material is expanded or blown free of expansion constraints.

3. A process as claimed in claim 2 further comprising: slitting the foam product parallel to its longitudinal axis and cooling it as a flat sheet.

4. A process as claimed in claim 1 wherein the partial cross-linking is controlled by rapid cooling of the mould.

5. A process as claimed in claim 1 wherein the partially cross-linked and partially chemically expanded material is expanded or blown while oriented with its longitudinal axis aligned vertically while standing free.

6. A process as claimed in claim 1 wherein the partially cross-linked and partially chemically expanded material is heated while hanging on a substantially horizontal revolving mandrel or roller.

7. A process as claimed in claim 1 wherein the mould is heated by hot air or hot oil.

8. A process as claimed in claim 1 wherein the preform and partially chemically expanded material is a compounded polyolefin foam material.

9. A process as claimed in claim 1 where the partially cross-linked and partially chemically expanded material is expanded into a foam product by heating.

* * * * *